Aug. 3, 1926. 1,594,869
H. K. ALTICK
ELECTRICALLY CONTROLLED AND AUTOMATIC GEAR SHIFT FOR AUTOMOBILES
Filed May 10, 1920 6 Sheets-Sheet 2
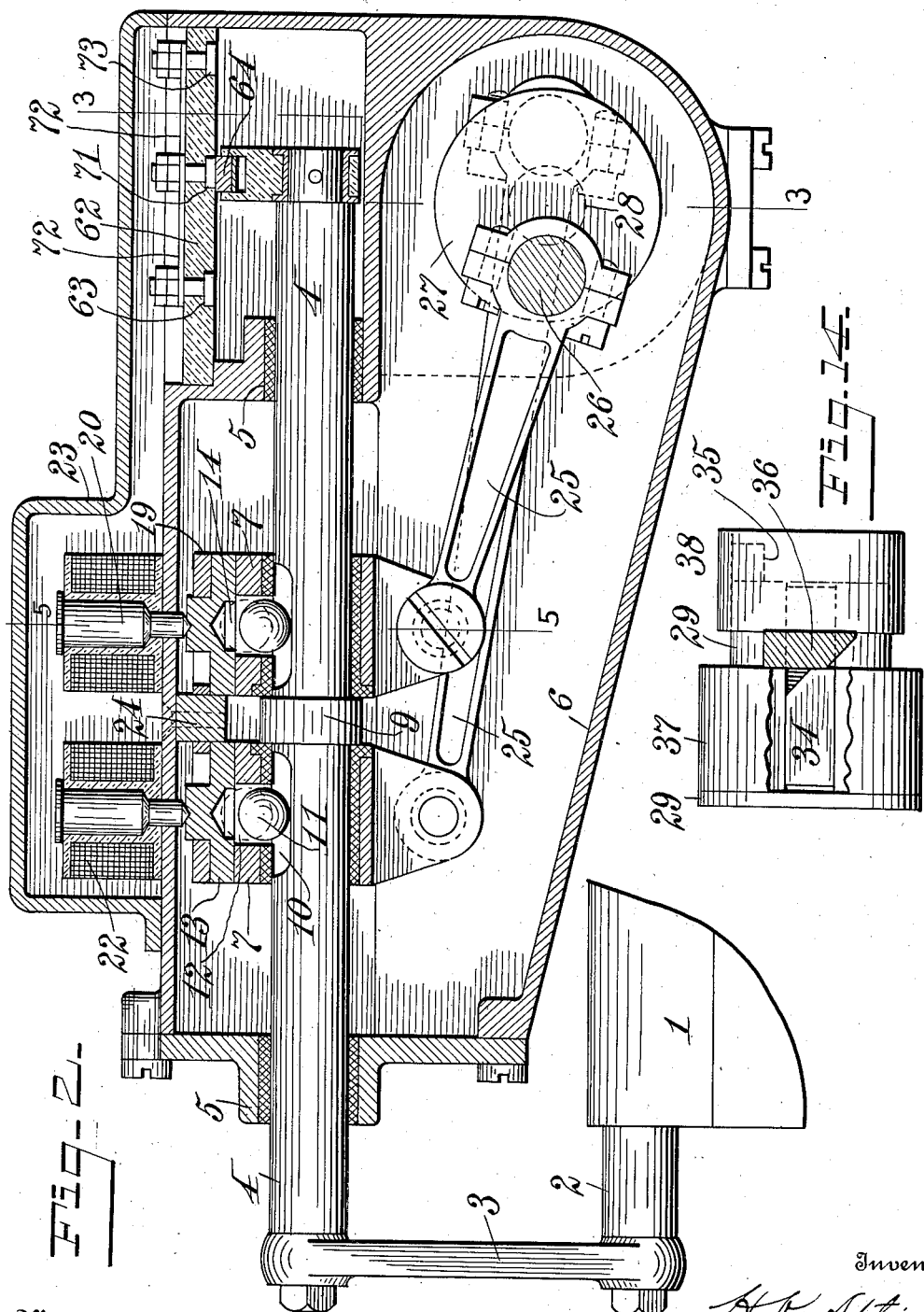

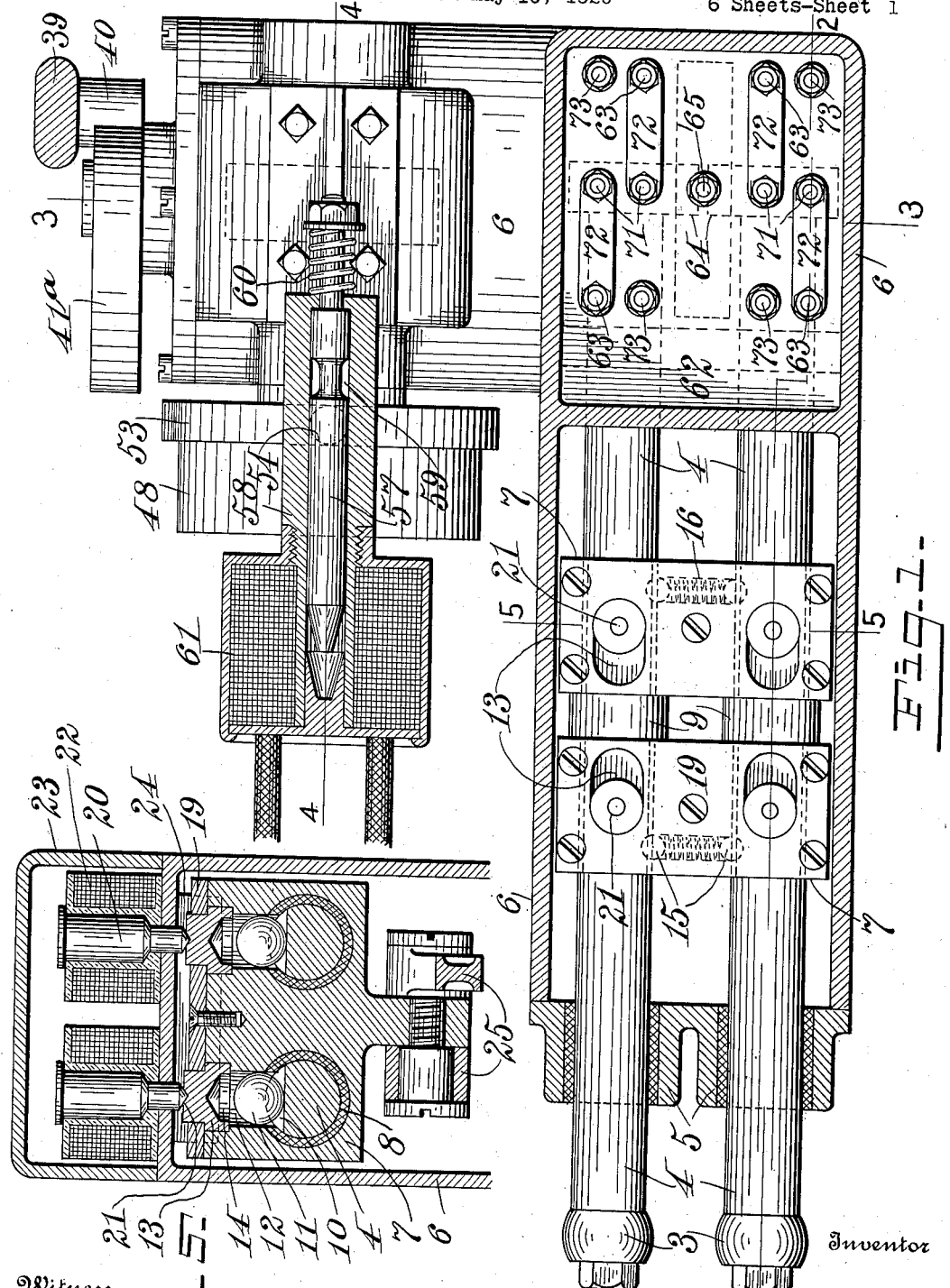

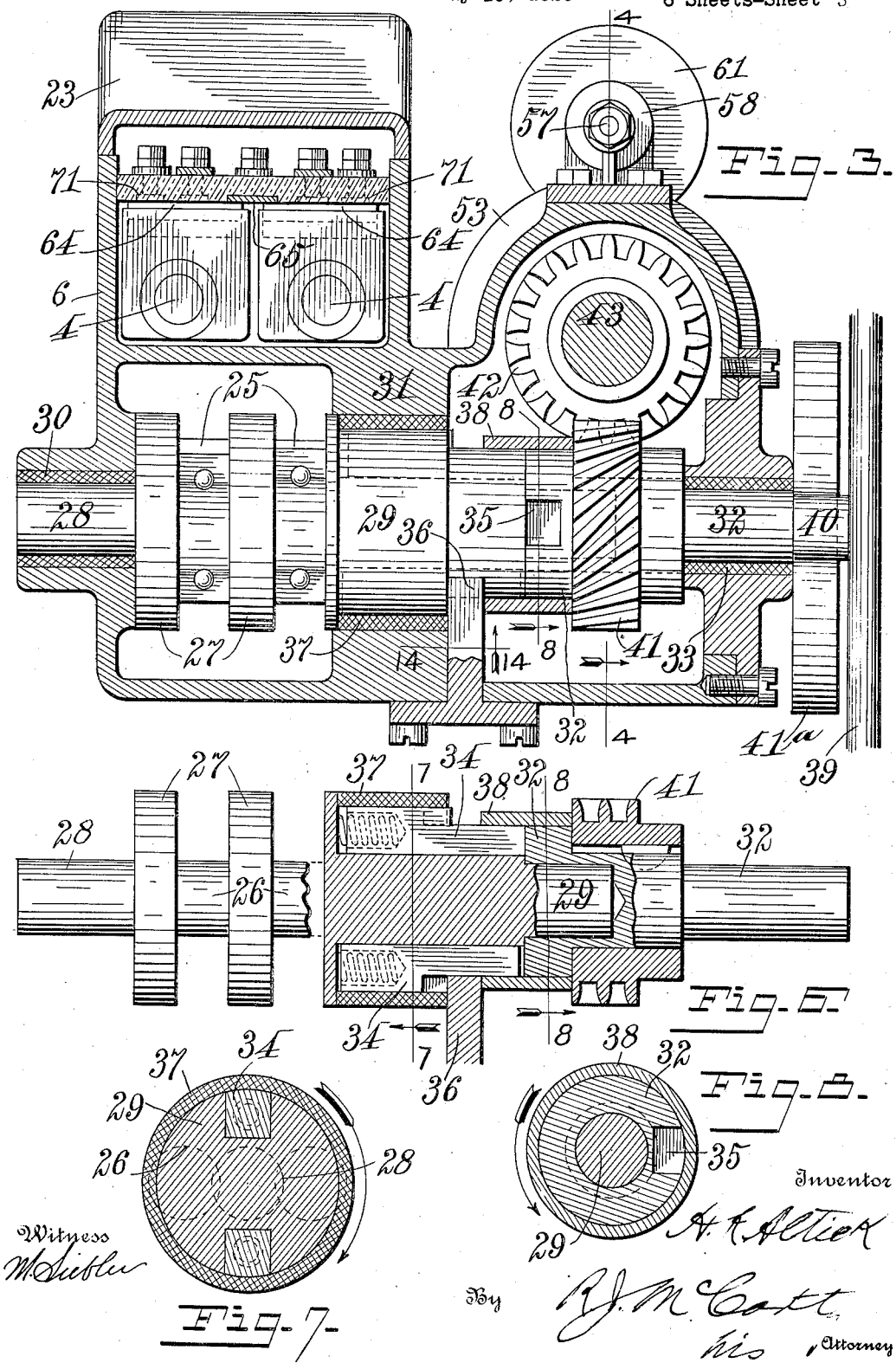

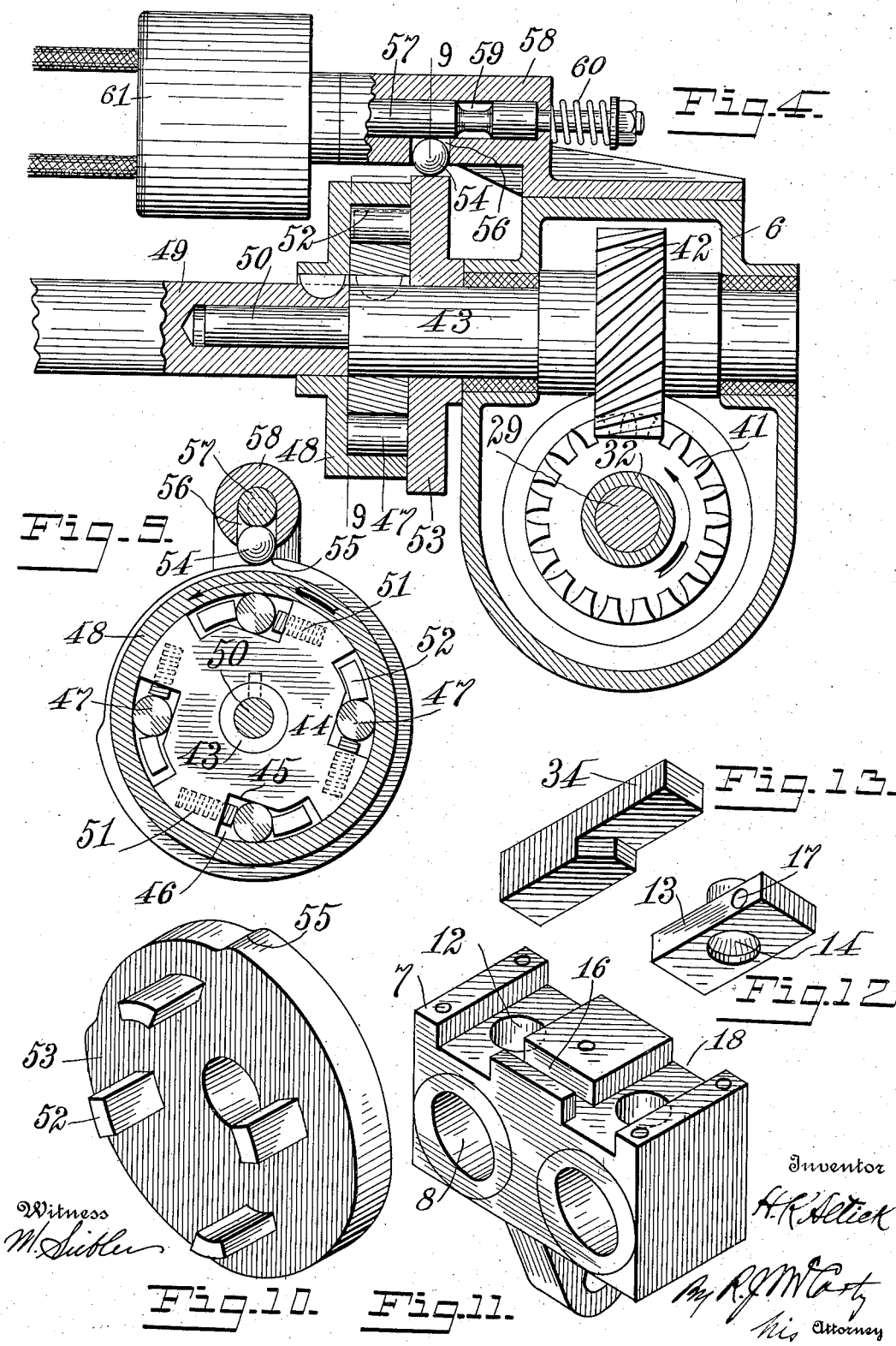

Aug. 3, 1926.                                                    1,594,869
H. K. ALTICK
ELECTRICALLY CONTROLLED AND AUTOMATIC GEAR SHIFT FOR AUTOMOBILES
Filed May 10, 1920          6 Sheets-Sheet 5

Inventor
H. K. Altick
By R. J. McCarty
Attorney

Witness

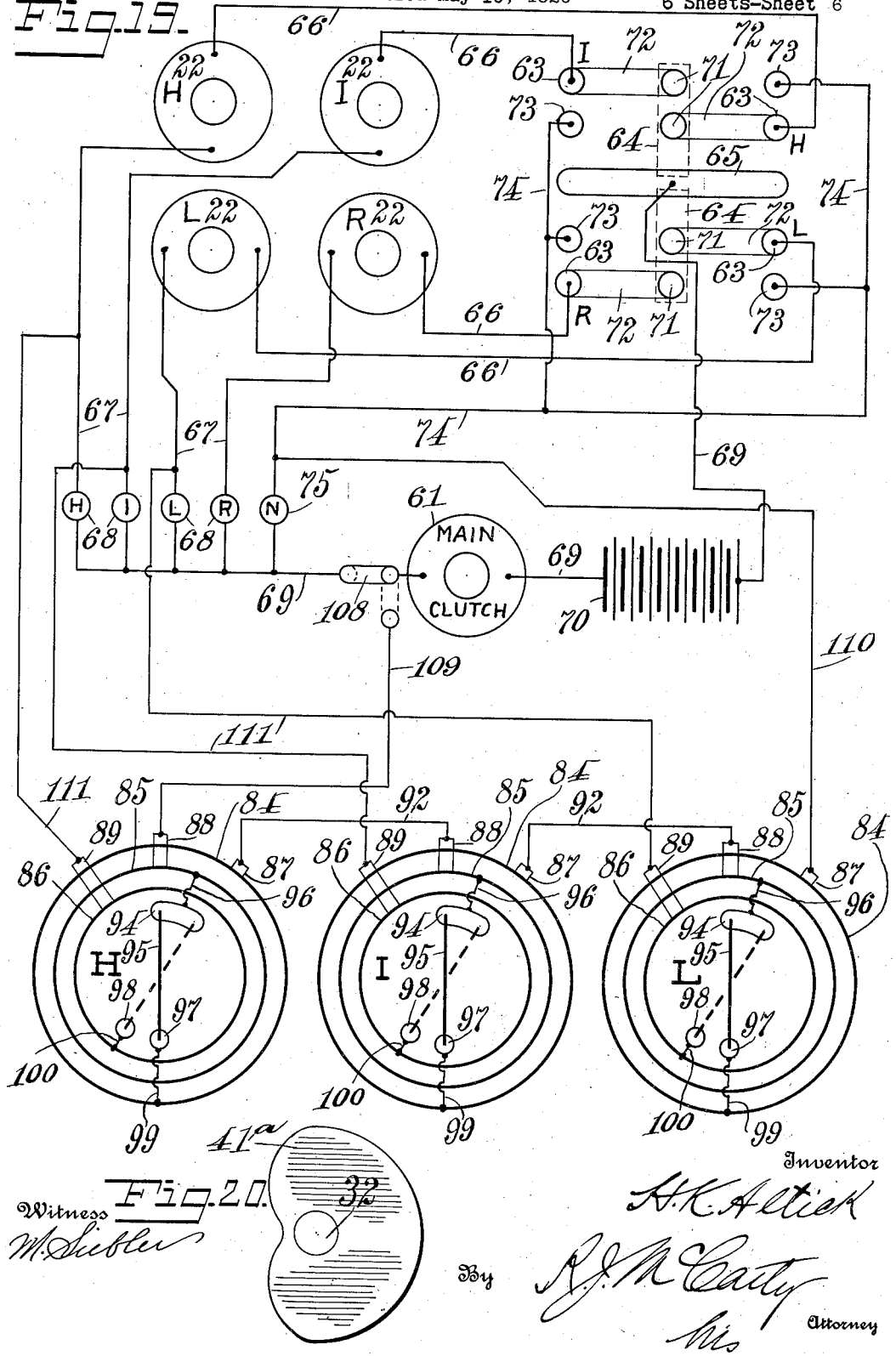

Patented Aug. 3, 1926.

1,594,869

UNITED STATES PATENT OFFICE.

HAROLD K. ALTICK, OF DAYTON, OHIO.

ELECTRICALLY-CONTROLLED AND AUTOMATIC GEAR SHIFT FOR AUTOMOBILES.

Application filed May 10, 1920. Serial No. 380,247.

This invention relates to new and useful improvements in electrically controlled and automatic gear shifts for automobiles. The present invention is an improvement of the mechanism shown and described in my Patent No. 1,346,151 of July 13, 1920. The primary object of the present invention is to provide means whereby the transmission gears are shifted by the same power which drives the automobile and commensurate with and controlled by the speed of the automobile. A further object of said invention is to provide electrical, and automatic mechanical means for dispensing with manual labor in shifting the transmission gears of an automobile. A further object of said invention is to provide means whereby an electrical gear shift may be operated either selectively or automatically. These and other objects will appear in the description to follow in connection with the accompanying drawings.

Figure 17:
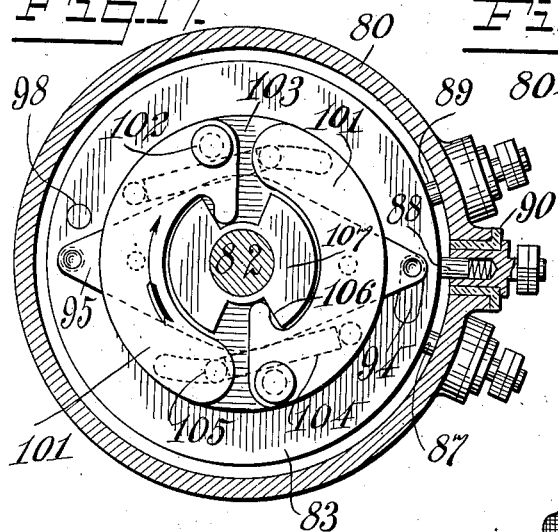
Figure 15:
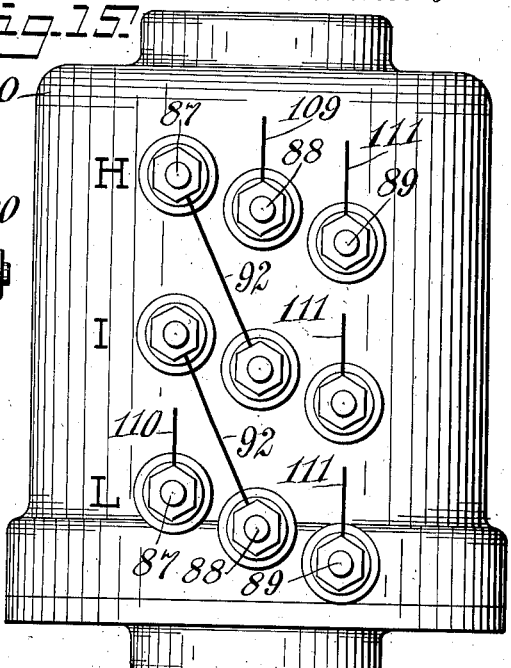
Figures 16, 18:
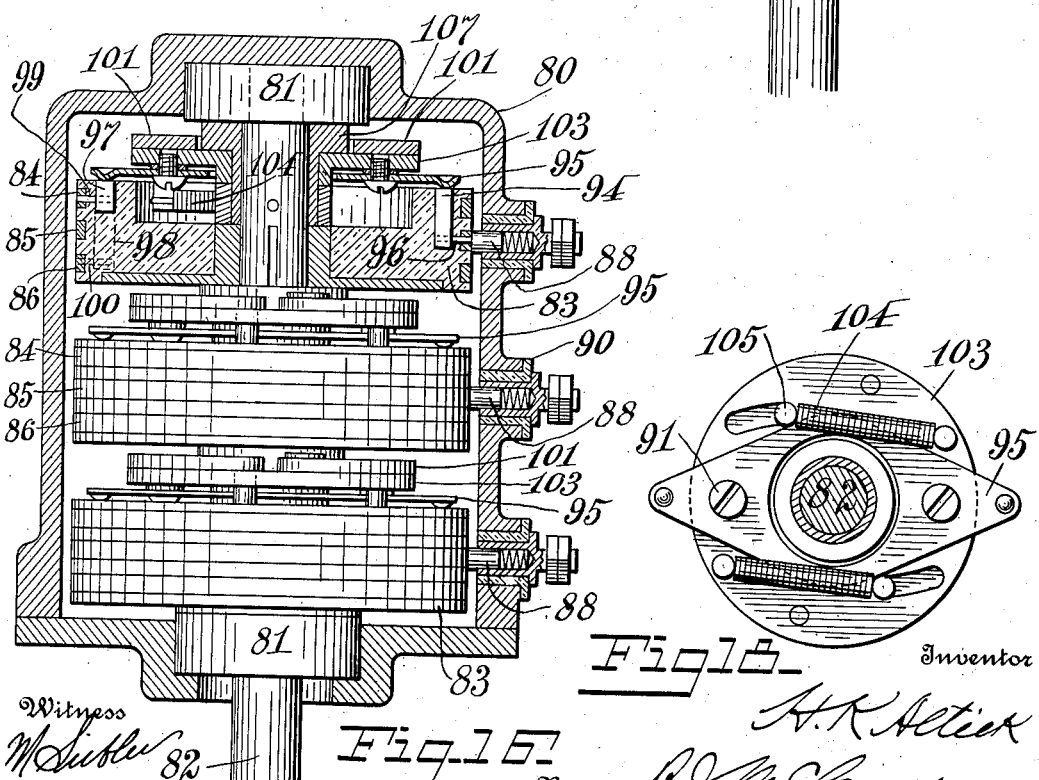

Referring in general terms to the accompanying drawings, Fig. 1, Sheet 1, is a top plan view of the mechanism with parts of the casing shown in section; Fig. 2, Sheet 2, is a sectional elevation on the line 2—2 of Fig. 1; Fig. 3, Sheet 3, is a section on the line 3—3 of Figs. 1 and 2; Fig. 4, Sheet 4, is a section on the line 4—4 of Fig. 1; Fig. 5, Sheet 1, is a section on the line 5—5 of Figs. 1 and 2; Fig. 6, Sheet 3, is a detail sectional view of the transmission shafts and their clutch; Fig. 7, Sheet 3, is a section on the line 7—7 of Fig. 6; Fig. 8, Sheet 3, is a section on the line 8—8 of Fig. 6; Fig. 9, Sheet 4, is a detail sectional view of the main clutch on the line 9—9 of Fig. 4; Fig. 10, Sheet 4, is a perspective view of the "throw out" for the main clutch; Fig. 11, Sheet 4, is a perspective view of one of the cross heads; Fig. 12, Sheet 4, is a perspective view of one of the latches for the gear shifters; Fig. 13, Sheet 4, is a perspective view of the bolt for the secondary clutch; Fig. 14, Sheet 2, is a detail view of the secondary clutch; Fig. 15, Sheet 5, is a view of the automatic control switch; Fig. 16, Sheet 5, is a longitudinal vertical sectional elevation through the same; Fig. 17, Sheet 5, is a top plan view of the same, partially in section; Fig. 18, Sheet 5, is a bottom plan view of the individual governors; Fig. 19, Sheet 6, is a diagrammatic view of the electrical connections; and Fig. 20, Sheet 6, is a detail view of the "throw out" cam for the automobile clutch.

Referring more particularly to the drawings, the numeral —1— (Fig. 2) represents the well known sliding transmission gear of an automobile. The individual gears of the transmission, as is well known, may be shifted to four different positions in the present instance, said positions being known as, reverse, low, intermediate and high. The gears are shifted to these positions by two sliding members —2—, there being a member —2— for two positions of the gears, one member accommodating the high and intermediate positions while the other accommodates the low and reverse positions. In the position of the parts as shown in the drawings, the mechanism is in a neutral position and none of the gears are set. To set the gears, the members —2— are moved individually in either direction. The members —2— are in turn shifted by the following mechanism which forms the subject matter of the present invention. The said members —2— are connected, by means of arms —3—, with sliding rods —4— mounted in bearings —5— of a casing —6—. The rods —4— are movable in either direction from a neutral position, shown in the drawings, by cross-heads —7— provided with openings —8— (Fig. 11) which receive the said rods. The rods —4— are provided with collars —9— adapted to be engaged by the cross-heads when the rods are moved to a central or neutral position. The rods act as guides for the cross-heads. To clutch the said rods to the cross-heads, they are provided with recesses —10— adapted to receive the lower portions of balls —11— which lie in openings —12— in the cross-heads. Mounted above the balls —11— are slides —13— provided with recesses —14— adapted to permit the balls to elevate and to ride on the top of the rods. The slides —13— are lightly held in a normal position, or that shown in the drawings, by spring controlled balls —15— which lie in recesses —16— in the cross-heads, and which engage the slides through means of recesses —17—. The slides —13— are adapted to move in grooves —18— in the cross-heads —7— and are held therein by cover plates —19—. Whenever one of the cross-heads is reciprocated and one of its slides is retarded, the retarded slide will move over its respective ball thereby preventing the ball elevating and clutching the cross-head to the respective rod when said ball reaches the end of the recess. The slides —13— are retarded by plungers —20— the lower ends of which are adapted to enter recesses —21— in the tops of the slides and which slide in and are under the control of solenoids —22—. There is a solenoid —22— for each slide —13—. When any one of the said solenoids is energized, its respective plunger will retard the respective slide and will overcome the respective ball lock —15—. The slides —13— are not retarded during the entire stroke of the cross-heads but only to an extent sufficient to lock the balls —11— in the recesses —10—. When the parts are in a normal position the plungers —20— are in engagement with the slides, but the engagement is not such that the resistance of the ball locks —15— will be overcome except when the solenoids are energized. The solenoids are mounted on top of the casing and are provided with a cover —23—. The cross-heads —7— move concurrently in opposite directions and either of the rods —4— may be moved in either direction by energizing the proper solenoid. To return the slides —13— to a normal position with their recesses lying over the balls, a bar —24— is provided which is mounted on the casing and is adapted to engage the slides when the cross-heads move to a neutral position. The cross-heads are reciprocated by connecting rods —25— attached thereto and to crank pins —26— on disc —27— having shaft extensions —28— and —29—. The cross-heads may be reciprocated by any well known means. The shaft extensions —28— and —29— have bearings —30— and —31— in the casing. Journaled on one end of the shaft extensions —29— is a short shaft —32— also journaled on bearings —33— in the casing. The shaft extension —32— is adapted to be clutched to the shaft —29— by means of resiliently sliding keys —34— in the shaft extension —29— and a recess —35— in the shaft —32—, there being two keys and one recess. The keys —34— are moved out of the recess and the shafts are disconnected by a stationary cam —36— (Fig. 14) mounted in the casing —6—. The keys are held in their sliding position by bands —37— and —38—. The band —37— performs the additional function of a journal in the bearing —31—. The shaft —29— makes one complete revolution to a half revolution of the shaft —32—. This construction is provided to permit the friction clutch (not shown) of the automobile to be thrown out prior to the shifting of the gears. The friction clutch of the automobile is operated by the well known form of foot lever —39— which, in the present instance, is provided with a roller —40— in operative relation with a cam —41ᵃ— mounted on the shaft —32—. The cam —41ᵃ— is adapted to throw out the friction clutch during the first quarter revolution of the shaft —32— and to throw in the same during the last quarter revolution. During the intervening half revolution the shaft —29— makes its half revolution and shifts the gear of the transmission. Mounted upon the shaft —32— is a spiral gear —41— in mesh with a spiral gear —42— on a shaft —43— journaled in the upper portion of the casing. The gears —41— and —42— have a one to one ratio. The shaft —43— is adapted to be driven from the motor of the automobile, or any other source of power, through a main clutch as follows (Fig. 4). Attached to the shaft —43— is a disc —44— provided with tangential surfaces —45— forming wedge shaped recesses or pockets —46—. Mounted in the pockets —46— and in engagement with the surfaces —45—, are rollers —47— also in engagement with the inside surface of the flange of a cup —48—. The cup —48— is secured to a shaft —49— having a bearing at —50— and which is connected to the motor or other source of power. When the cup —48— rotates in the direction of the arrow in Fig. 9, the rollers —47— wedge in the pockets —46— and clutch the cup —48— with the disc —44—. The rollers —47— are provided with springs —51— which are adapted to move the said rollers to a wedging position. The said rollers —47— are forced out of their wedging position to disengage the clutch by fingers —52— mounted on a disc —53— freely mounted on the shaft —43—. During the time the clutch is connected, the disc —53— rotates with the clutch, but when the said disc is prevented from rotating, the fingers disengage the rollers from the disc and cup and thus permit the cup to rotate independently. The disc —53— is prevented from rotating by a ball —54— adapted to engage a cam shoulder —55— on the disc. The ball —54— is mounted in a pocket —56— and its position is controlled by a plunger —57—. The plunger —57— is mounted in a guide —58— supported by the casing. The said plunger is provided with a recess —59— adapted to permit the ball —54— to elevate. The plunger —57— is moved in one direction by a spring —60— and in a direction to place the recess over the ball by a solenoid —61—. The said plunger —57— forms the armature of the solenoid which, when energized, moves the plunger —57— to bring the recess —59— over the ball —54— thereby permitting the ball to be elevated by the shoulder —55—, the disc —53— to rotate, the rollers —47— to wedge between the cup —48— and the disc —44—, and the shaft —49— to rotate the shaft —43—. The solenoids are electrically actuated and are controlled by manual and speed controlled means through a distributor. The distributor consists of a plate —62— of insulating material mounted in the casing —6—. The said plate —62— is provided with four contact points —63— one for each position of the transmission gears. The contact points —63— of the intermediate and high positions are adapted to be engaged by a brush —64— mounted on the end of the respective rod —4—. The contact points —63— of the reverse and low positions are adapted to be engaged by a similar brush —64— mounted on the rod —4— of the reverse and low positions. When the high or intermediate gear has been set, the respective brush —64— will be in contact with the contact points —63— representing the opposite gear of the same rod —4—, which is also true of the low and reverse positions. This will be clear from an inspection of Fig. 19 where it will be seen that the contact points —63— are disposed the opposite of the solenoids —22—. The brushes —64— are in constant electrical contact with a ground strip —65—. As shown in Fig. 19 the contact points —63— are connected with their respective solenoids —22— by conductors —66—. The solenoids —22— are connected by means of conductors —67— with individual push buttons —68—. When one of the brushes —64— is in engagement with one of the contact points —63—, the circuit through a solenoid will be completed through a common conductor —69— connected to all of the push buttons. The conductor —69— passes through the solenoid —61— of the main clutch and a source of electrical energy —70— and is connected to the ground strip —65—. In addition to the contact points —63—, each position of the transmission gears is represented by contact points —71— placed centrally and engaged by the brushes —64— when the rods or shifters —4— are in a neutral position. The contact points —71— are connected to their respective contact points —63— by strips —72—. To permit any one of the gears to be returned to neutral, the plate —62— is provided with contact points —73— adapted to be engaged by the brushes when the gears are set. These contact points —73— are instrumental in energizing the main clutch through electrical connections —74— which pass through a push button —75— and are connected into the conductor —69—.

The push buttons —68— and —75— are of the well known type in which each button is held in a depressed position until another button is depressed at which time the first button will be automatically elevated.

The operation of the parts above described is as follows: The parts are shown in a neutral position in the drawings and consequently none of the transmission gears are in mesh. Whenever it is desired to set the gears of the transmission in any one of the four power transmitting positions, the push button —68— of the desired position is depressed which closes a circuit through the common conductor —69—, solenoid —61—, of the main clutch, battery —70—, ground strip —65—, respective contact —71—, respective strip —72—, respective contact —63—, respective conductor —66—, respective solenoid —22— and respective conductor —67— to the push button —68— which has been set. When the solenoid —61— was energized, the plunger —57— (Fig. 4) permitted the ball —54— to elevate thereby releasing the disc —53—. The releasing of the disc permits the springs —51— to force the rollers between the cup and the disc —44—, thereby clutching the shafts —49— and —43—. The shafts —49— and —43— will make one complete revolution for the reason which will hereinafter appear. Through the agency of the gears —42— and —41—, the shaft —32— will also receive a complete revolution. During the first quarter of the revolution, the cam —41ª— throws out the friction clutch of the automobile. At the end of the first quarter revolution the recess —35— picks up one of the pawls —34— and clutches the shaft —32— to the shaft —29—. This clutching engagement continues during a half revolution of the shaft which movement is communicated to the shaft —29—. The clutching engagement is terminated by the cam —36— which permits the shaft —32— to complete its full revolution. During the last quarter revolution, the cam —41ª— permits the friction clutch to be set. During the intervening half revolution of the shafts —32— and —29—, the crank pins —26— and connection rods —25— move the cross-heads to the left and right, but such movement is in one direction only for each cross-head. It will be remembered that concurrent with energization of the main clutch solenoid —61—, which started the parts moving, one of the individual solenoids —22— was also energized. Upon the energization of the selected solenoid —22— its respective core —20— was held down which retarded the respective latch —13— which clutched the respective rod —4— to the cross-head —7— which is moving in the direction to set the selected transmission gear. The shifting of one of the rods —4— places the brush —64— carried thereby on the contact —63— of the opposite gear set of that rod. After the mechanism has set the transmission gears in any selected position, the said mechanism remains in the position to which it has been actuated until another selection is made. After having made one gear selection, the gears may be returned to neutral by operating the button —75—. This operation closes a circuit through the conductor —69—, main clutch solenoid —61—, battery —70—, ground —65—, brush —64— of the previously actuated rod —4—, point —73— in contact therewith, and conductor —74— to the button —75—. The operation of the mechanism is the same as first described with the exception that no solenoid —22— is energized, the cross-heads move in a direction opposite to their respective previous movements and the previously moved rod is actuated, not through the agency of the latch —13— and ball —11— as previously, but is returned to normal through the engagement of one of the cross-heads with the collar —9— of the previously actuated rod —4—. When the cross-heads —7— are moved to a normal position, the previously retarded latch —13— is returned to a normal position by the bar or block —24—. If, instead of returning to normal after the first gear selection, it is desired to make some other gear selection, the proper button —68— is operated. This operation closes a circuit which may have two paths, depending upon whether the second selection is of the same rod —4— as the first. If of the same rod the circuit passes through the conductor —69—, solenoid —61— of the main clutch, battery —70—, ground strip —65—, brush —64—, of the previously actuated rod —4—, contact point —63— of the previously selected gear and conductor —66— and solenoid —22— of the actuated button —68—. The energization of the solenoid —61— starts the shifting mechanism, previously described, to move, which during the half revolution of the shaft —29— brings the parts to a normal or neutral position. As the second selected button is still depressed the circuit will be remade through the contact point —71— of the previous selection which again sets the mechanism in motion and moves the previously actuated rod —4— in the direction to set the secondarily selected gear. It will be noted that in making a selection from normal to any gear set or vice versa, the shafts —43— and —32— make one revolution and the shaft —29— makes half a revolution, but in making a selection of one gear set to another gear set, the shafts —43— and —32— make two revolutions and the shaft —29— makes a complete revolution. If the second gear selection is of the opposite rod —4—, the circuit will pass through the conductor —69—, solenoid —61—, battery —70—, ground strip —65—, brush —64— of the rod —4— of the present gear selection, and respective contact —71—, strip —72—, contact —63—, conductor —66—, solenoid —22— and conductor —67—, and through the operated push button —68—. The closing of this circuit will return the previously actuated rod —4— and the cross-heads —7— to a neutral position. As the brush —64— of the rod —4— of present selection has not been disturbed, the mechanism will continue in operation and will shift the rod —4— of the present selection to make the proper gear shift. It is to be understood that when making a selection from one gear selection to another the first energization of the selected solenoid is of no consequence, and it only functions during the second half of the operation.

In Figs. 16 to 18 inclusive is illustrated the automatic control, by means of which the gear shift, above described, is controlled and whereby the transmission gears are shifted commensurate with the speed of the vehicle. The automatic control is mounted in a suitably supported housing —80— provided with bearings —81— which receive a shaft —82—. The shaft —82— is driven from one of the wheels of the automobile by the well known flexible shaft (not shown) and which rotates at a speed proportional to the speed of the vehicle. Mounted within the housing —80— and upon the shaft —82— are three automatic switches, one for each of the gear selections, high, intermediate and low. The reverse selection is not controlled by the automatic switch. All of the automatic switches are identical in construction with the exception that each is adjusted to a different tension. Each of the said automatic switches consists of a revolving disc —83— provided with three collector rings —84— —85— and —86—. The collector rings are provided with individual brushes —87— —88— and —89— mounted in suitable insulated pockets —90— in the casing and provided with suitable binding posts. Mounted within the disc —83— is a contact —94— in engagement with one end of a brush —95—. The brush —95— rotates with the disc but is adapted to rock relative thereto. The said brush is always in engagement with the contact —94— which is electrically connected to the ring —85— by a connection —96—. The other end of the said brush —95— is adapted to engage either one or the other of two contacts —97— and —98—, the contact —97— being connected to the ring —84— by connector —99—, while the contact —98— is connected to the ring —86— by a connector —100—. The relative rocking movement of the brush —95— is imparted thereto by a speed controlled governor consisting of fly weight levers —101— pivoted at —102— to a disc —103— freely mounted on the shaft —82—. The brush —95— is secured to the disc and is carried thereby, through the agency of screws —91—. The long ends of the levers —101— move outwardly under the action of centrifugal force and against the tension of springs —104— secured to the disc —103— and to pins —105— extending from said levers and passing through the disc —103—. The tension of the springs —104—, for each governor and gear selection is adjusted to permit the respective fly weight levers —101— to move outward when the speed of the shaft —82— reaches a point where it is desirable for the respective gears to be shifted. When the long ends of said levers move outward, the short ends thereof fulcrum against surfaces —106— of a head —107— attached to the shaft —82—. The outward movement of the levers rocks the disc —103— and brush —95— thereby disengaging the brush from the contact —97— and placing the same in engagement with the contact —98—. When the automobile is at rest, a neutral circuit is maintained through the automatic control which connects into the "neutral" circuit of the gear shift as above described, as follows. Referring to Fig. 19. Starting at the battery, the current will pass through the conductor —69—, solenoid —61—, a switch —108—, conductor —109— to the high automatic switch, brush —88—, ring —85—, conductor —96—, contact —94—, brush —95—, contact —97—, conductor —99—, ring —84—, brush —87— and through the intermediate and low automatic switches. The three automatic switches are connected by conductors —92— and the neutral circuit is the same through each. The neutral circuit leaves the automatic switch at the brush —87— of the low switch and is connected into the conductor —74— of the neutral circuit of the gear shaft through the agency of a conductor —110—. When the neutral circuit through the automatic switch is closed the gear shift functions the same as when the button —75— is manually actuated. It will be noted that the switch —108— permits the method of control of the gear shift to be selected, and it is to be understood, that before the automobile is under way, the low gears are shifted by manually depressing the "low" button —68—. When the automobile gains speed and any one of the levers or governors —104— is actuated, which will occur concurrently, the neutral circuit through the automatic switch will be broken at the respective contact —97—. The respective brush —95— will, however, establish a respective circuit through the respective contact —98— which will connect into the respective circuit of the gear shift through respective connector —100—, ring —86—, brush —89— and a respective conductor —111— which connects into the respective conductor —67— of the respective gear shift circuit. When the circuit of any one gear selection is closed at the contact —98—, the gear shift functions the same as when the circuit is closed at the push buttons —68—. The above operation of the automatic control takes place as the automobile gains speed, but it will be understood that a reverse operation takes place when the speed of the automobile decreases.

While I have described the various parts with some minuteness, it is not to be inferred that some variations from the structural characteristics may not be made within the scope of the invention as defined.

Having described my invention, I claim:

1. In a gear shifting mechanism a movable element operatively connected with the gear to be shifted, actuating members for said movable element slidably mounted thereon and movable concurrently in opposite directions, clutching devices for connecting said element with said members, separate selectively controlled means for controlling the respective clutching devices, a main clutch actuating device, power operated driving mechanism, and means actuated by said driving mechanism to first operate said clutch actuating device to disconnect said clutch, then move said actuating members concurrently in opposite directions and then again operate said clutch actuating device to connect said clutch.

2. In a gear shifting mechanism a movable element operatively connected with the gear to be shifted, actuating members for said movable element slidably mounted thereon and movable concurrently in opposite directions, clutching devices for connecting said element with said members, separate selectively controlled means for controlling the respective clutching devices, a main-clutch actuating device, a shaft, power operated driving mechanism having means for rotating said shaft through a single revolution, means operated by said shaft during the first and last portions of its movement to operate said clutch actuating device, and means operated by said shaft during the intermediate portion of its movement to cause said actuating members to move concurrently in opposite directions.

3. In a gear shifting mechanism, a movable element operatively connected with the gear to be shifted, actuating heads slidably mounted on said element, movable concurrently in opposite directions and adapted to be connected with said element to impart movement to the same, clutching devices for connecting said element with the respective heads, separate means for controlling the respective clutching devices, and means for selectively actuating said controlling means.

4. In a gear shifting mechanism, a movable element operatively connected with the gear to be shifted, actuating heads slidably mounted on said element and movable concurrently in opposite directions, clutching means for connecting said element with said heads, and means for selectively controlling said clutching means, said actuating heads and said movable member having cooperating parts, other than said clutching means, to restore said movable element to its normal position.

5. In a gear shifting mechanism, a movable element operatively connected with the gear to be shifted, actuating heads slidably mounted on said element and movable concurrently in opposite directions, clutching devices for connecting said movable element with said actuating heads, separate means for controlling said clutching devices, selecting means for said controlling means, said actuating heads and said movable member having cooperating parts, other than said clutching devices, to restore said movable element to its normal position.

6. In a gear shifting mechanism, a movable element, heads movable concurrently in opposite directions, clutching members between said element and said heads, latches controlling said clutching means, a stop adapted to be engaged by said latches whereby said latches are returned to normal position, and selecting means for said latches.

7. In a gear shifting mechanism, a movable element having recesses therein and a collar thereon, heads movable concurrently in opposite directions, members mounted in said recesses and adapted to be engaged by said heads, latches mounted in said heads and adapted to interlock said heads and said element, selecting means for said latches, a stop adapted to return said latches to a normal position, said heads being adapted to engage said collar to return said movable element to a normal position.

8. In a gear shifting mechanism, a movable element having recesses therein and a collar thereon, heads provided with pockets and movable concurrently in opposite directions, said heads being adapted to engage said collar to return said movable element to a normal position, spherical members mounted in said pockets and lying within said recesses, latches mounted in said heads and adapted to lock said spherical members in said recesses, armatures in operative relation with said latches and adapted to retard said latches, selective means for said armatures, and a stop adapted to return said latches to a normal position.

9. In a gear shifting mechanism, a movable element, heads movable concurrently in opposite directions, clutching means for said element and heads, an electrical distributor actuated by said movable element, and selective means for said clutching means controlled by said distributor.

10. In a gear shifting mechanism, a movable element, heads movable concurrently in opposite directions, electrically actuated clutching means for said element and heads, a distributor actuated by said movable element, and selective means electrically connected to said distributor and clutching means.

11. In a gear shifting mechanism, a movable element, shifting means for said element, electrical clutching means for said element and shifting means, driving means for said shifting means including an electrically controlled clutch, and selective means for said clutching means controlling said clutch.

12. In a gear shifting mechanism, a movable element, shifting means for said movable element, means for clutching said element and shifting means, driving means provided with recesses, two pawls carried by said shifting means and adapted to singly enter said recesses, a cam adapted to shift said pawls whereby said shifting means is intermittently driven, and an automobile clutch-control-cam actuated by said driving means.

13. In a gear shifting mechanism, a movable element, shifting means for said element, electrically controlled clutching means for said element and shifting means, a distributor actuated by said movable element, driving means including a main clutch for said shifting means, and selective means for said clutching means controlling said main clutch and in turn controlled by said distributor.

14. In a gear shifting mechanism, a movable element, intermittently movable shifting means for said element, electrically controlled clutching means for said element and shifting means, a distributor actuated by said element, driving means including a main clutch for said shifting means, an intermittent clutch between said driving means and said shifting means, an automobile clutch-control-cam actuated by said driving means, and selective means for said clutching means also controlling said main clutch and in turn controlled by said distributor.

15. In a gear shifting mechanism, a movable element, shifting means for said element, electrically controlled clutching means for said element and shifting means, a distributor actuated by said element, driving means including a main clutch for said shifting means, manual and automatic selective means for said clutching means also controlling said main clutch and in turn controlled by said distributor, and a control selective switch connected between said manual and automatic selective means.

16. In a gear shifting mechanism, a movable element, shiftable heads movable concurrently in opposite directions, electrically controlled clutching means for said element and heads, there being a clutching means for each of the opposite positions of the element, an electrical distributor actuated by said element adapted when the element is in one position to be electrically connected with the clutching means of the other position, and electrical controlling means for said heads, clutch and distributor.

17. In a gear shifting mechanism, a movable element, shiftable heads movable concurrently in opposite directions from a neutral position and adapted to directly move said element to a normal position, electrically controlled clutching means for said element and heads, there being a clutching means for each opposite position of the element, an electrical distributor actuated by said element adapted when the element is in one position to electrically connect with the clutching means of the other position, electrical control means for said clutches, heads and distributor, and a common circuit closed at said distributor, when the element is in any position to which it may be shifted, said common circuit controlled by said controlling means.

18. In a gear shifting mechanism, a movable element, members, each adapted to move said element in a different direction, means for connecting a selected member with said movable element, a driving member, an operative connection between said driving member and said first mentioned members, said connection comprising a clutch, and electrically operated means for controlling the operation of said clutch and of the means for connecting said first mentioned members with said movable element.

19. In a gear shifting mechanism, a movable element, members, each adapted to move said element in a different direction, means for connecting a selected member with said movable element, a driving member, an operative connection between said driving member and said first mentioned members, said connection comprising a clutch, and means for controlling the operation of said clutch to render the same inoperative.

20. In a gear shifting mechanism, a movable element, members, each adapted to move said element in a different direction, electrically controlled means for connecting a selected actuating member with said movable element, a driving member, an operative connection between said driving member and the first mentioned members comprising a normally inoperative clutch, and electrically controlled means for rendering said clutch operative.

21. In a gear shifting mechanism, a movable element, members, each adapted to move said element in a different direction, electrically controlled means for connecting a selected actuating member with said movable element, a driving member, an operative connection between said driving member and the first mentioned members comprising a normally inoperative clutch, electrically controlled means for rendering said clutch operative, an electrical distributor controlled by said movable element to control said electrically controlled devices, a plurality of circuits to said distributors, and means for closing a selected circuit.

22. In a gear shifting mechanism, a gear shifting element, an actuating device, selectively controlled means for establishing different operative connections between said actuating device and said shifting element, a driving member, an operative connection between said driving member and said actuating device, said connection comprising a clutch, and electrically controlled means for controlling the operation of said clutch and the means for connecting said actuating device with said shifting element.

23. In a gear shifting mechanism, a gear shifting element, an actuating device, selectively controlled means for establishing different operative connections between said actuating devices and said shifting element, a driving member, an operative connection between said driving member and said actuating device, said connection comprising a clutch, and electrically controlled means for controlling the operation of said clutch and the means for connecting said actuating device with said shifting element, said electrically controlled means comprising a distributor controlled by said shifting element.

24. In a gear shifting mechanism, a gear shifting element, an actuating device, electrically controlled means for establishing different operative connections between said actuating device and said shifting element, a driving member, an operative connection between said driving member and said actuating device, said connection comprising a clutch, and electrically controlled means for controlling the operation of said clutch, a circuit for both electrically controlled means, a distributor in said circuit, and a switch for controlling said circuit.

25. In a gear shifting mechanism, a gear shifting element, an actuating device, selectively controlled means for establishing different operative connections between said actuating device and said shifting element, a driving member, a shaft, a clutch connection between said driving member and said shaft, electrically operated means for controlling said clutch connection, and an automatically operated clutch for connecting said shaft with said actuating device.

26. In a gear shifting mechanism, a gear shifting element, an actuating device, selectively controlled means for establishing different operative connections between said actuating device and said shifting element, a driving member, a shaft, a clutch connection between said driving member and said shaft, means for controlling said clutch, an automobile clutch actuating device connected with said shaft, and means for automatically connecting said shaft with the first mentioned actuating device after said automobile clutch actuating device has been operated.

27. In a gear shifting mechanism, a gear shifting element, an actuating device, selectively controlled means for establishing different operative connections between said actuating device and said shifting element, a driving member, a shaft, a clutch connection between said driving member and said shaft, means for controlling said clutch, an automobile clutch actuating device connected with said shaft, and an automatically operated clutch having a retarding action for connecting said shaft with the first mentioned actuating device.

28. In a gear shifting mechanism, a gear shifting element, an actuating device, selectively controlled means for establishing different operative connections between said actuating device and said shifting element, a driving member, a shaft, a clutch connection between said driving member and said shaft, a cam connected with said shaft and adapted to control two movements of an automobile clutch upon each rotation of said shaft, and an automatically operated clutch for connecting said shaft with said actuating device and disconnecting the same therefrom.

29. In a gear shifting mechanism, a gear shifting element, an actuating device, selectively controlled means for establishing different connections between said actuating device and said shifting element, a driving member, a shaft, a normally inoperative clutch to connect said shaft with said driving member, electrically controlled means to render said clutch operative, a cam connected with said shaft and adapted to control an automobile clutch during the first and last portions of each rotation of said shaft, and means for automatically connecting said shaft with and disconnecting the same from said actuating device during the intermediate portion of each rotation of said shaft.

30. In a gear shifting mechanism, a gear shifting element, an actuating device, speed controlled means for establishing different operative connections between said actuating device and said shifting element, a driving member, an operative connection between said driving member and said actuating device, said connection comprising a clutch, and electrically operated means to control the operation of said clutch.

31. In a gear shifting mechanism, a gear shifting element, an actuating device, means for establishing different operative connections between said actuating device and said shifting element, electrically operated devices for controlling said means, a plurality of circuits for said devices, speed controlled means for controlling said circuits, and power operated means for operating said actuating device.

In testimony whereof I affix my signature.

HAROLD K. ALTICK.